May 16, 1939.    S. E. CAMPBELL    2,158,690
METHOD FOR TREATING OILS
Filed Sept. 3, 1935
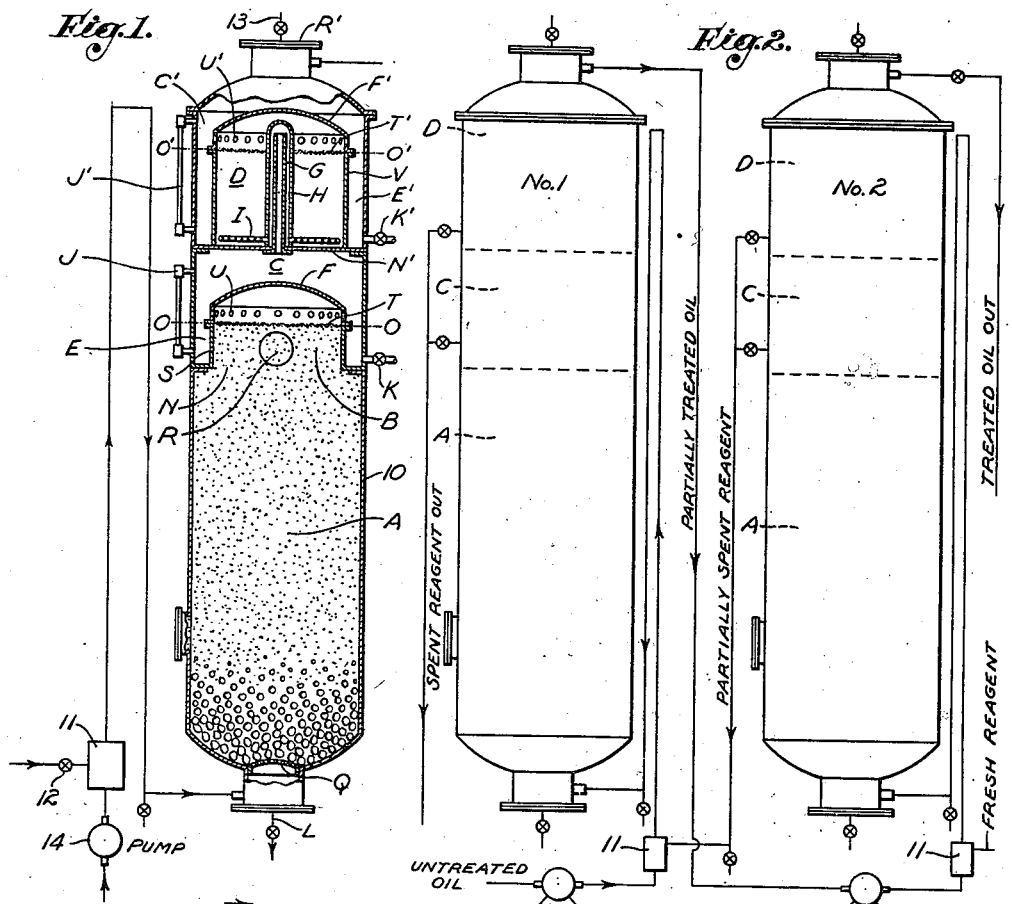
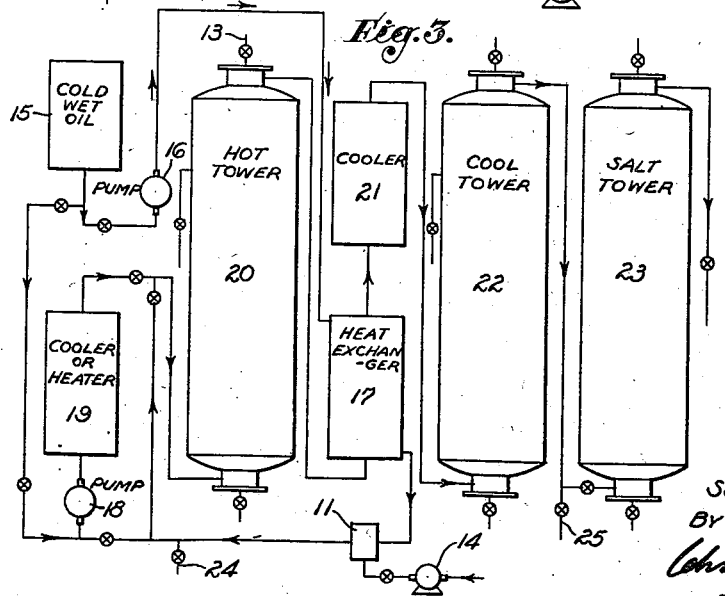
INVENTOR
SUMNER E. CAMPBELL
BY
*Charles L. Stokes*
ATTORNEY.

Patented May 16, 1939

2,158,690

UNITED STATES PATENT OFFICE 2,158,690

METHOD FOR TREATING OILS

Sumner E. Campbell, Long Beach, Calif.

Application September 3, 1935, Serial No. 38,992

4 Claims. (Cl. 196—45)

This invention relates to an improved method and apparatus for treating petroleum, or its distillates, in which separation of undesired constituents and/or reaction products from a treated oil is accomplished quickly and economically.

In its broadest sense, the invention is directed to the separation of liquids, or reagents, from petroleum or its distillates which are immiscible with the same, and is applicable, for instance, to the separation of water (either salt or fresh) from an emulsion of oil and water, or to the separation of reagents such as sulphuric acid, alkaline solutions, liquid sulphur dioxide, sodium plumbite or the like from oils treated with the same, and in general the invention refers to the separation of immiscible liquids of different specific gravities.

More specifically, the invention includes the intimate mixing of reagents with petroleum, or its distillates, and equivalent materials such as coal tar or shale oil distillates, for the removal of undesired constituents and thereafter the separation of the reagents with reaction products from the oil.

Referring to the drawing:

Fig. 1 is a vertical sectional view of an apparatus suitable for the practice of the herein-described method.

Fig. 2 is a view in elevation showing a plurality of towers such as shown in Fig. 1 interconnected for increased efficiency in the use of a reagent.

Fig. 3 is a diagram showing the flow of liquids in which the undesired portion is heavier than the oil and in which refrigeration, or heating, may be employed.

In Fig. 1 there is shown an arrangement of a tower to be used for the separation of sludges or extracts obtained by treating petroleum oils with sulphuric acid or liquid sulphur dioxide. The same arrangement is also applicable for the separation of alkaline liquors or sludges such as would be obtained in treating a petroleum distillate or other oils with a solution of caustic soda, sodium carbonate or the like. Fig. 1 illustrates such a tower 10 provided with two packed sections A and D, but while this illustration shows only two such sections, it should be understood that there may be any desired number thereof in a given tower and also that a series of such towers may be employed in a treating operation.

Referring to Fig. 1, oil is mixed with the reagents by any desired means, the one illustrated being an aspirating injector type of mixing device 11 wherein, due to the velocity of the oil and the well known construction within the mixer, a reagent such as an acid or alkaline solution is drawn into the mixer by suction in substantially any desired amount, which is regulated by suitable means such as a valve 12, depending on the severity of the treatment to be employed.

The tower 10 is preferably cylindrical in shape and is approximately three to four times as high as its diameter. The tower is provided with a valved pipe L for draining liquid therefrom. At the bottom of the tower there is also provided an inlet so arranged as to secure adequate distribution of the incoming liquid by means of a perforated plate Q. This plate also acts to support the finely divided inert contacting material with which the lower part A of the tower is filled. A packing material found highly desirable is finely divided quartz, although other equivalent material to cause coalescence of the heavier liquid to be removed can be used. The size of the particles used will depend somewhat on the viscosity of the liquids to be separated but it is found in the treatment of petroleum distillates such as gasoline and kerosene that the use of No. 4 silica as a layer in the bottom of the tower supporting the balance of the packing, consisting of No. 16 silica, is highly efficient for the purpose of this invention.

The lower portion of the tower is completely filled to the line 0—0 with this above described packing material. N is an annular ring tightly attached to the wall of the tower 10 and which is provided with a cylindrical riser or nozzle S equipped with a tightly fitting cover F, which has a perforated plate or screen T which fits tightly on the packing to prevent its shifting which would cause channeling when the tower is in operation. Cover F is also provided with holes U of suitable shape and spacing to allow efflux of liquids from section B outwardly toward the walls of the tower.

Section B comprising the space within nozzle S is of such area as to but slightly increase, if at all, the velocity of the liquid flowing therethrough over the velocity of the liquid flowing upwardly through section A.

Ring N and the cylindrical riser S surrounding section B form a launder E between the wall of the tower and the riser. Launder E is provided with a draw-off valve at K for maintaining a desired heavy liquid level therein.

Section C and the launder E contain no packing material and section C provides a zone of low velocity. Section C is also equipped with a suitable gage glass J for determining the heavy liquid level in the launder E or section C. While in the illustration but one nozzle surrounds section B it should be understood that several such nozzles can be satisfactorily employed to secure more even distribution, which would be desirable in towers of large diameter.

The top of section C consists of a plate N' tightly attached to the wall of the tower, in which sets the open riser G surrounded by a shield H, which is closed at its upper end and tightly attached at the bottom to the plate N'. There may be any desired number of such risers to accomplish satisfactory distribution within section D.

The shield H may be perforated just above the point where it joins the plate N' when several such risers are used, or it may be provided at its bottom end just above the plate N' with a plurality of perforated tubes I extending radially therefrom.

Tightly attached to the plate N' is a cylinder V enclosing section D. This cylinder is equipped with a tightly fitting cover F" also provided with a perforated plate or screen T' on the bottom thereof and spaced holes U' to permit the efflux of liquid from section D into a zone of low velocity C' including the launder E' formed between the wall of the tower and the cylindrical member surrounding section D. Section C' is provided with a suitable gage glass J' for determining the heavy liquid level in the launder E' and section C'.

Section D is similarly filled with finely divided inert contacting material such as quartz or the like to the bottom of the cover F" and the launder E' is provided with a draw-off valve K' for maintaining the heavy liquid level therein or in section C' at any desired point. The tower 10 is preferably provided with manholes R and R' for withdrawing packing material or introducing the same. The cover of the manhole R' may be advantageously equipped with a suitable vent 13.

The operation of the above described tower will be illustrated in a case where sulphuric acid and a petroleum distillate, such as kerosene, are intimately mixed for the refining of the oil. The oil to be treated is introduced by pump 14 and is intimately mixed outside the tower with the acid in mixer 11, and the mixture with or without settling is passed into the bottom thereof. Before starting this operation section A up to the line 0—0 is filled with the heavier liquid, which may be fresh sulphuric acid or a sulphuric acid sludge obtained from a previous treatment, preferably derived from the same type of oil. Section A is thus completely filled to the line 0—0 with finely divided inert contacting material, tightly held therein by the cover F and completely immersed in heavy liquid of the type to be separated.

The mixture of oil and acid or sludge passes upwardly through section A. Due to the innumerable interstices between the particles of the finely divided irregular shaped packing material, the globules of oil which would otherwise tend to be spherical in form are distorted an infinite number of times by passage through the interstices of the packing to cause finely entrained acid or sludge particles within the oil globules to be exposed to the maintained body of acid or sludge with which section A is filled. There is thus accomplished substantially complete coalescence of the finely divided acid or sludge particles with the maintained body of the same liquid in section A. Because fresh acid, or sludge when so employed, is being continuously introduced into the bottom of the tower, naturally the heavy liquid level at O will tend to rise in section C, but it is desired generally not to permit the heavy liquid level in the launder E to rise materially above the line 0—0.

As the mixture of oil and acid or sludge emerges through the apertures U in the cover F the velocity of flow of both liquids is very materially lowered to the end that more ready separation of heavier liquid from the oil is accomplished, due to the difference in specific gravity.

The velocity of flow through section C is relatively low as compared with that through the packed sections A and B.

As the oil issues from section C it passes upwardly through riser G and downwardly through the space between it and the shield H. At this point the oil contains a relatively small amount of entrained acid or sludge particles and these last traces of such liquid coalesce in the acid or sludge with which section D is filled to the line O', due to the action of the contact material. The heavy liquid level in the launder E' may be held at any desired point but preferably not above the line O'. This is accomplished by withdrawing excess sludge or heavy liquid through the draw-off valve at K', and it should be understood that valves K and K' may be placed at such liquid levels 0—0 and 0'—0' and be of the well known automatic liquid level regulator type.

When treating petroleum distillates, for example, with alkaline solutions or with sulphuric acid or liquid sulphur dioxide, it is found highly desirable, because of increased efficiency, to provide for any given step at least two such towers similarly arranged as shown in Fig. 2, and when two such towers are employed it is found that the efficiency of refining and utilization of reagents is greatly increased if partially spent acid, sludge, or other reagent from the similar launders E and E' of the second tower is used as the incoming reagent for the mixer of the raw oil being fed to tower No. 1 and the mixer of tower No. 2 is then fed with fresh acid or other reagent. Inasmuch as the oil issuing from tower No. 1 will have had a very considerable portion of its impurities already removed in tower No. 1 a more efficient refining operation requiring less reagent is accomplished. In the case where two towers are employed with a given reagent the sludge or substantially spent reagent withdrawn from the launders E and E' of tower No. 1 of a series may be disposed of or utilized in any desired manner.

It should be pointed out that in contradistinction to known methods, in the tower as above described the oil and reagent or heavy liquid is not required to counterflow, but that the flow of the mixture of oil and reagent or heavy liquid is in one direction, namely upward through the packed sections A and D. Also that the zone of low velocity C is of great importance in that in lowering the velocity of flow through the tower in this section a much more complete separation of heavy liquid from the oil is made possible due to the difference in specific gravity.

Again, by immersing the packing material in the heavy liquid, which is tightly held in the tower preventing channeling, that substantially complete separation of the heavy liquid from the oil occurs due to coalescence. This is of particular importance because it is decidedly different from agglomeration wherein dependence is placed on the deposition of minute globules of heavy liquid on the surfaces of the packing material, these minute globules gradually agglomerating into larger drops which finally form streams that must flow downwardly against the upward flowing streams of oil. This latter necessitates the use of larger sized packing with larger interstices therebetween than is desirable to use. In general, the smaller the spaces between the packing particles the more distorted will the oil globules be; therefore, the more readily will exposure of entrained particles within these globules with subsequent coalescence with the main body of the same liquid held in section A take place.

Another point of particular importance is the change of the direction of flow of the effluent through the holes of the covers F and F'. Also the greatly lowered velocity in section C very materially accelerates separation of heavy liquid from the oil by gravity.

Fig. 3 illustrates an arrangement of towers when the application of heat is desirable to aid in the separation of oil from contained immiscible liquids heavier than the oil or of greater specific gravity, such as the breaking of oil and water emulsions, the applied heat serving to reduce the viscosity of the oil and thus facilitate separation.

However, it is found in breaking petroleum emulsions by the necessary heat that certain disadvantages occur which are now overcome by this invention.

If, for instance, emulsified crude oil is heated to a temperature of 200° F. and then introduced into the bottom of a tower constructed as shown in Fig. 1, finely divided moisture in the form of a fog is carried over with the upwardly flowing stream of oil through the contact section A to the succeeding sections so that complete separation is impossible.

If, now, such heated emulsified oil is run through a system such as shown in Fig. 3, this difficulty of complete separation of the oil and water is overcome.

More specifically, this is accomplished by first passing emulsified oil, crude or otherwise, while heated to a desired temperature through a first contact section wherein the bulk of the water is separated and is then cooled to at least atmospheric temperature prior to passage through a second contact section whereby the moisture in the form of a fog is first reduced by cooling to minute particles of water which are coalesced and separated as described in the second or succeeding contact sections. A further advantage accrues from this mode of operation by conservation of valuable light constituents of the oil which otherwise may be lost by evaporation if carried over with hot oil.

Describing in detail the operation of the process of Fig. 3, cold wet, or emulsified oil from storage 15 is taken by pump 16 and passed through a heat exchanger 17 and then through a heater 19 wherein its temperature is finally raised to about 200° F.

The thus heated oil is passed into the bottom of a tower 20, which is preferably insulated and filled with any of the before described contact materials substantially immersed in a maintained body of the heavier liquid to be removed and similarly constructed to tower 10, but not necessarily containing the separating section D. In tower 20 at relatively high temperature and relatively low velocity, the bulk of the water is separated and removed from the oil, which then passes through heat exchanger 17 wherein it gives up a large percentage of its applied heat to the cold wet oil and flows through a cooler 21 wherein its temperature is reduced to atmospheric temperature, or any desired lower temperature above the freezing point of water.

The thus cooled oil, which will then contain the aforesaid fog in the form of minute particles of water, passes upwardly through a second contact tower filled with contact material similarly immersed in a body of the heavier liquid to be removed wherein said minute particles of water are coalesced and separated.

If desired, the oil is then passed through a third tower 23 containing a contact material such as rock salt, or other hygroscopic material, wherein the last trace of water may be removed. Tower 23 is generally unnecessary for the treatment of so-called pipe-line oil as the system of Fig. 3 efficiently removes water from emulsified oil down to less than 1%.

While Fig. 3 shows for the sake of clarity, the different units of the system as separate units, it is obvious that by the application of well-known cooling apparatus the process of Fig. 3 may be carried on in a single tower such as shown in Fig. 1.

In the breaking of certain crude oil emulsions, it may be necessary to add certain chemicals to the oil in order to change surface tension conditions and such chemicals may be passed into the oil before contact as, for instance, at pipe 26.

While this description of the process of Fig. 3 with specific reference to breaking crude oil, or other oil, emulsions is not claimed herein but forms the subject matter of another application, certain portions thereof are applicable when treating certain oils, as for example, kerosene distillate, with liquid sulphur dioxide, when a low temperature of not more than 14° F. is necessary. Likewise, when treating cracked, or pressure, distillates or cracked gasoline with sulphuric acid, a low temperature of about from 0° to 32° F. is desirable in order to avoid excessive polymerization with consequent excessive losses.

In either of these cases, when using a tower like 10 in the system of Fig. 3 in place of tower 20, the oil will pass through a cooling heat exchanger 17 where the temperature may be partially, or wholly, reduced to the desired point and then has the reagent mixed therewith in mixer 11 by a reagent supply pump 14 to be passed, if necessary, through a second cooler 19 wherein the mixture is brought to the desired temperature after which it passes through the contact tower 20 wherein separation takes place as described for tower 10.

After contact in tower 20, the cold oil passes through heat exchanger 17 and is further brought down, if necessary, to a desired temperature in cooler 21 to be passed into a second tower 22 wherein the process of separation is repeated and may then be withdrawn through valve 25, the salt tower 23 being unnecessary with the above treating agents.

When such low temperatures are employed for different treating methods, which may include for instance the treatment of highly unsaturated oils to avoid excessive polymerization, towers 20 and 22 should be well insulated to give increased efficiency, as well as other parts of the system.

I claim as my invention:

1. The process of treating petroleum and other hydrocarbon oils with liquid reagents which comprises: continuously flowing a stream of petroleum oil intermingled with a liquid reagent of greater specific gravity directly through alternating zones of relatively high and low velocity, and withdrawing such liquid reagent from the zones of relatively low velocity as is separated therein without permitting flow of said stream through the separated reagent; the zones of relatively high velocity containing contact material sufficiently finely divided to assure coalescence of the liquid reagent while in the presence of a maintained body of said reagent through which said stream must pass in its entirety.

2. The process of treating petroleum and other hydrocarbon oils with liquid reagents which comprises: continuously flowing a stream of petroleum oil intermingled with a liquid reagent of greater specific gravity directly through alternating zones of relatively high and low velocity, and withdrawing such liquid reagent from the zones of relatively low velocity as is separated therein without permitting flow of said stream through the separated reagent; the zones of relatively high velocity containing contact material completely immersed in said liquid reagent and sufficiently finely divided and compacted to assure coalescence of the major portion of the supplied liquid reagent through which said stream must pass in its entirety.

3. The process of treating petroleum and other hydrocarbon oils with liquid reagents which comprises: continuously flowing a stream of petroleum oil intermingled with a liquid reagent of greater specific gravity directly and upwardly through alternating zones of relatively high and low velocity, and withdrawing such liquid reagent from the zones of relatively low velocity as is separated therein without permitting flow of said stream through the separated reagent; the zones of relatively high velocity containing contact material sufficiently finely divided to assure coalescence of the liquid reagent while in the presence of a maintained body of said reagent through which said stream must pass in its entirety.

4. The process of treating petroleum and other hydrocarbon oils with liquid reagents which comprises: continuously flowing a stream of petroleum oil intermingled with a liquid reagent of greater specific gravity directly through alternating zones of relatively high and low velocity while at a temperature of from about 0° to 32° F., and withdrawing such liquid reagent from the zones of relatively low velocity as is separated therein without permitting flow of said stream through the separated reagent; the zones of relatively high velocity containing contact material sufficient finely divided to assure coalescence of the liquid reagent while in the presence of a maintained body of said reagent through which said stream must pass in its entirety.

SUMNER E. CAMPBELL.